June 25, 1963    A. B. NEWTON    3,094,850
VEHICLE REFRIGERATION SYSTEMS
Filed March 28, 1960
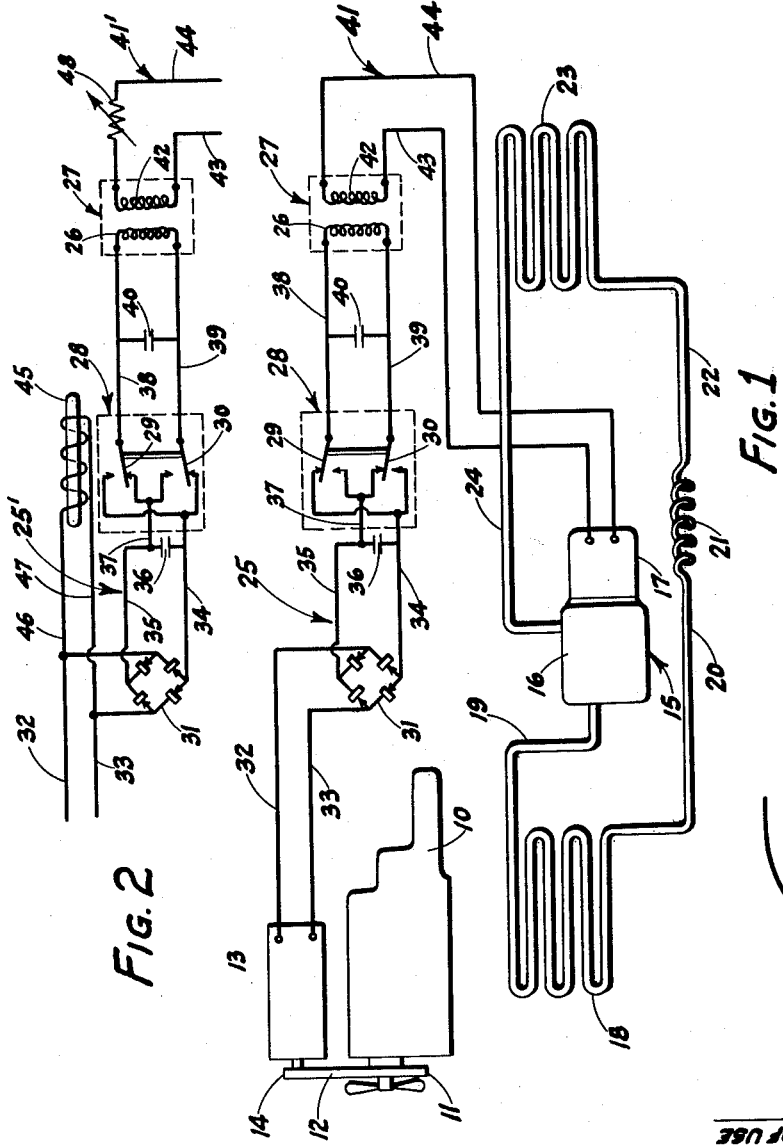
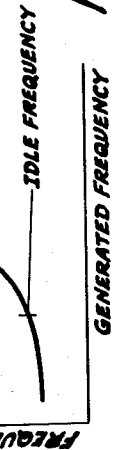
INVENTOR.
ALWIN B. NEWTON
BY
ATTORNEY

United States Patent Office 3,094,850
Patented June 25, 1963

3,094,850
VEHICLE REFRIGERATION SYSTEMS
Alwin B. Newton, York, Pa., assignor to Borg-Warner Corporation, Chicago, Ill., a corporation of Illinois
Filed Mar. 28, 1960, Ser. No. 17,978
7 Claims. (Cl. 62—132)

This invention relates to refrigerating systems for vehicles and, more particularly, to such a system wherein the vehicle prime mover drives an alternating current generator for producing electric current to be supplied to the hermetic motor of a refrigeration system.

In air conditioning or refrigerating a vehicle, it will be apparent that enough capacity must be supplied at low engine or idle speeds to maintain the desired temperatures within the vehicle. When the vehicle is speeded up to normal driving range, the system has much more capacity than is needed. In the past, this has been remedied by various methods. For example, a multi-speed drive may be connected between the prime mover and the generator, which provides for a 1–1 ratio between the two at idle speeds, and then at some intermediate speed, a stepped down ratio is provided in one or more steps.

It is an object of the invention to provide a refrigeration system for vehicles of the type wherein the vehicle prime mover drives an alternating current generator for producing current needed for an alternating current motor to drive a hermetic refrigerating compressor, and wherein the frequency of use of the generated current is maintained substantially constant irrespective of varying generated frequencies, whereby the capacity of the refrigeration system is maintained substantially constant. By "frequency of use" it is meant the frequency of the current supplied to the motor of the refrigerating system. By "generated frequency" it is meant the frequency of the current as generated by the generator.

Yet another object of the invention is to provide a system of the type just above-mentioned and wherein the frequency of use of the generated current is permitted to vary by a factor proportional to the generated frequency up to a desired level, and then maintained substantially constant at increasing generated frequencies beyond the desired level. It will be appreciated that this will have the effect of increasing the capacity of the refrigeration system up to a point and then maintain it substantially constant thereafter.

The invention consists of the novel constructions, arrangements and devices to be hereinafter described and claimed for carrying out the above-stated objects and such other objects as will appear from the following description of preferred embodiments of the invention described with reference to the accompanying drawings, in which:

FIG. 1 is a schematic representation of a refrigeration system according to the herein-disclosed invention, and wherein the frequency of use of the generated current is maintained substantially constant;

FIG. 2 is a modification wherein the frequency of use of the generated current is permitted to rise by a factor proportional to the generated frequency thereof up to a desired level and then maintained substantially constant; and FIG. 3 is a graph of frequency of use of the generated current against generated frequency for the FIG. 2 system, and showing a typical curve thereof.

Like numerals refer to like parts throughout the several views.

Turning now to the drawings, specifically FIG. 1, a prime mover 10 is shown. It will be appreciated that, for the purpose of this invention, prime mover 10 may be the vehicle engine or any moving part of the vehicle, such as an axle, wherein the speed thereof varies as the speed of the vehicle varies. As shown, prime mover 10 has a pulley 11 attached thereto, over which is trained a drive belt 12. An alternating current generator 13, having a pulley 14 attached thereto, is positioned to receive drive belt 12 so that the generator may be driven by the prime mover.

A typical refrigeration system includes a hermetic refrigerating compressor assembly 15, including a compressor 16 driven by an alternating current electric motor 17. The compressor 16 discharges to a condenser 18 by way of a hot gas line 19. A hot liquid line 20 connects the condenser 18 to a capillary 21, or any other pressure reducing device. From capillary 21, a cold liquid line 22 leads to an evaporator 23. A cold gas line 24 joins the evaporator to the inlet of compressor 16 to complete the system.

A first electrical circuit 25 is provided between alternating current generator 13 and a primary coil 26 of a transformer 27. Circuit 25 includes an inverter 28 connected between generator 13 and primary coil 26. Inverter 28 is of the double pole, double throw type and includes a pair of vibrating arms 29 and 30. A rectifier 31 is provided between the alternating current output of generator 13 and the inverter 28 for converting alternating current to direct current for delivery to the inverter. A pair of electrical leads 32 and 33 lead from the output of the generator to two opposite sides of rectifier 31. A lead 34 leads from the third side of rectifier 31 to a first input terminal of inverter 28. A lead 35 connects the fourth side of rectifier 31 to lead 34 and includes a condenser 36 therein. A lead 37 joins a second input terminal of inverter 28 to lead 35. A first output terminal of inverter 28 is connected to one side of primary coil 26 by way of a lead 38. A lead 39 connects the other side of primary coil 26 to a second output terminal of inverter 28. A condenser 40 is connected between leads 38 and 39.

A second electrical circuit 41 is provided and includes a secondary coil 42 of transformer 27 and the electric motor 17. A pair of leads 43 and 44 connect transformer secondary coil 42 to electric motor 17. It will be apparent that circuit 41 may optionally be set up as a polyphase circuit, if such is desirable.

In operation, arms 29 and 30 of inverter 28 continuously vibrate, setting up alternate circuits between generator 13 and primary coil 26 as follows: at such time as inverter 28 is in the position shown in FIG. 1, current flow will be from generator 13 through lead 32 or 33 (depending on the direction of current flow) to rectifier 31 and thence by way of lead 35, vibrating arm 30, and lead 39 through primary coil 26, and thence by way of lead 38, vibrating arm 29, lead 34, rectifier 31, and lead 32 or 33 (as the case may be) back to the generator to complete the circuit. With vibrating arms 29 and 30 in their lower position, current will flow from generator 13 through lead 32 or 33 (again, depending on the direction of current flow) to rectifier 31, and thence by way of lead 53, vibrating arm 29, and lead 38 through primary coil 26, in an opposite direction to that just above set out. From primary coil 26, current flow is through lead 39, vibrating arm 30, lead 34, rectifier 31 and lead 32 or 33 (as the case may be) back to the generator to complete the circuit. This induces an alternating current flow through transformer secondary coil 42 and a circuit is set up by way of leads 43 and 44 to electric motor 17.

It will be appreciated that inverter 28 will act to reverse current flow through primary coil 26 at a constant frequency (frequency of vibration of arms 29 and 30), irrespective of the actual frequency of generator 13. This will have the effect of providing a constant frequency alternating current flow through secondary coil 42, as set out above.

The purpose of condenser 36 is to protect the points of inverter 28. Condenser 40 acts to produce an approximation of a sine wave form in the alternating current circuit.

It will be appreciated that, in some installations, it will be desirable to provide somewhat more capacity at the higher engine speeds found in a normal driving range than obtain at idling speeds, to provide for somewhat greater losses due to increased air velocity over the car's outer surfaces. This increased capacity need only be somewhat more than the capacity at idle speeds, and certainly need not be directly proportional to the increase in speeds between idle and normal drive speeds, which may vary as much as 8–1. An approximately 1½ times increase in capacity, for example, should be more than sufficient to provide for the greater losses at higher engine speeds. FIG. 2 shows how such an increase in capacity may be obtained. Turning now to FIG. 2, only a portion of an eelctrical circuit 25' is shown, corresponding to circuit 25. The basic difference between the two is the addition of an alternating current magnet 45, which is attached across leads 32 and 33 by way of a pair of leads 46 and 47 respectively, so that the magnet is supplied with alternating current from generator 13. The magnet 45 is positioned with respect to the inverter 28 such that the magnetic field thereof encompasses the vibrating arms 29 and 30. Arms 29 and 30, in this embodiment, must be of magnetically susceptible material. The effect of the magnetic field will be to retard the vibrating arms 29 and 30, such that the frequency of vibration thereof would be somewhat less than would be the case were there no magnetic field. As the magnetic field decreases, the net effect is to permit the arms 29 and 30 to vibrate at a somewhat greater frequency. It will be appreciated that the greater the actual frequency of the generator 13, due to the increased speed of the prime mover 10, the greater the losses within the magnet. For this purpose, it would be desirable that alternating current generator 13 be of the variable frequency constant voltage type. With increasing frequency and greater losses, the magnetic field is weakened, permitting the vibrating arms 29 and 30 to vibrate at a somewhat greater frequency, as aforesaid. This effect will continue up to a certain point, after which time an increase in the generated frequency will have no further loss effect on magnet 45 and, therefore, inverter 28 will vibrate at a constant frequency at that point and beyond.

Turning now to FIG. 3, a typical curve of frequency of use vs. generated frequency is shown. It will be seen that the frequency of use of the generated current varies somewhat along a parabolic line with changes in generated frequency up to a point, at which point the frequency of use remains substantially constant with increasing generated frequency. The upper and lower limits of the curve can be changed by the particular combination of permeability and hysteresis chosen for magnet 45. However, the curve will retain its characteristic shape of a parabolic curve.

Turning again to FIG. 2, only a portion of an electrical circuit 41' is shown, corresponding to circuit 41. Circuit 41' may optionally include a variable resistor 48 for the purpose of varying the voltage across the secondary coil 42, if such is desired.

As aforesaid, both in the specification and in the claims, "prime mover" represents any moving part of a vehicle wherein the speed thereof varies as the speed of the vehicle varies, and which is used to drive the herein-disclosed generator; "frequency of use" means the frequency of the current supplied to the alternating current motor driving the refrigerating compressor.

I wish it to be understood that my invention is not to be limited to the specific constructions and arrangements shown and described, except only insofar as the claims may be so limited, as it will be apparent to those skilled in the art that changes may be made without departing from the principles of the invention.

I claim:

1. In combination, a variable speed prime mover; an alternating current generator driven by said prime mover at variable speeds; a transformer having a primary and a secondary coil, with the primary coil thereof being connected in an electrical circuit with said generator; a constant frequency inverter connected in said electrical circuit; means between said generator and inverter for rectifying the alternating current output of said generator to direct current for delivery to said inverter; a second electrical circuit including said transformer secondary coil and an alternating current motor; and refrigeration compression means driven by said motor.

2. In combination, a variable speed prime mover; an alternating current generator driven by said prime mover at variable speeds; a transformer having a primary and a secondary coil, with the primary coil thereof being connected in an electrical circuit with said generator; a constant frequency inverter connected in said electrical circuit; means between said generator and inverter for rectifying the alternating current output of said generator to direct current for delivery to said inverter; magnetic means connected to the alternating current output of said generator and positioned with respect to said inverter such that the magnetic field thereof encompasses said inverter; a second electrical circuit including said transformer secondary coil and an alternating current motor; and refrigeration compression means driven by said motor.

3. The combination set out in claim 2 wherein said inverter includes a magnetically susceptible movable arm.

4. The combination as set out in claim 3, wherein said alternating current generator is of the variable frequency, constant voltage type.

5. In combination, a variable speed prime mover, an alternating current generator driven by said prime mover at variable speeds producing a corresponding variable generated frequency; an alternating current motor electrically connected to said generator for receiving current therefrom; refrigeration compression means driven by said electric motor; and means for varying the frequency of use of the generated current by a factor proportional to the generated frequency thereof, said varying means further including means for maintaining said frequency of use substantially constant beyond a desired level irrespective of increasing generated frequency.

6. The combination as set out in claim 5, wherein said alternating current generator is of the variable frequency, constant voltage type.

7. In a vehicle refrigeration system of the type including a variable speed prime mover, an alternating current constant voltage generator driven by said prime mover at variable speeds producing a corresponding variable genertated frequency, a refrigerating compressor assembly comprising an alternating current motor electrically connected to said generator for receiving current therefrom, and refrigeration compression means driven by said electric motor, the improvement comprising means for varying the frequency of use of the generated current by a factor proportional to the generated frequency thereof, said varying means further including means for maintaining said frequency of use substantially constant beyond a desired level irrespective of increasing generated frequency.

References Cited in the file of this patent
UNITED STATES PATENTS

| | | |
|---|---|---|
| 2,292,630 | Gerstang | Aug. 11, 1942 |
| 2,641,736 | Jaeschke | June 9, 1953 |
| 2,776,379 | Sargeant | Jan. 1, 1957 |
| 2,786,334 | Wolf | Mar. 26, 1957 |